United States Patent
Hozumi et al.

(10) Patent No.: US 11,355,786 B2
(45) Date of Patent: Jun. 7, 2022

(54) SODIUM ION CONDUCTOR AND SOLID-STATE SODIUM-ION BATTERY

(71) Applicant: TOYOTA JIDOSHA KABUSHIKI KAISHA, Toyota (JP)

(72) Inventors: Masato Hozumi, Mishima (JP); Shin Ushiroda, Susono (JP); Keita Niitani, Shizuoka-ken (JP); Hiroko Kuwata, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/064,205

(22) Filed: Oct. 6, 2020

(65) Prior Publication Data

US 2021/0119266 A1  Apr. 22, 2021

(30) Foreign Application Priority Data

Oct. 21, 2019 (JP) .............. JP2019-192286

(51) Int. Cl.
*H01M 10/00* (2006.01)
*H01M 10/39* (2006.01)

(52) U.S. Cl.
CPC .. *H01M 10/3918* (2013.01); *H01M 2300/008* (2013.01)

(58) Field of Classification Search
CPC ....... H01M 2300/0068; H01M 10/054; H01M 2300/008; H01M 10/3918; Y02E 60/10
See application file for complete search history.

(56) References Cited

U.S. PATENT DOCUMENTS

2007/0054170 A1* 3/2007 Isenberg ........... H01M 10/3918
                                                      204/424
2020/0343580 A1* 10/2020 Yushin .................. H01M 10/44

OTHER PUBLICATIONS

Wan Si Tang et al., "Stabilizing Superionic-Conducting Structures Via Mixed-Anion Solid Solutions of Monocarba-closo-borate Salts", ACS Energy Letters, 2016, pp. 659-664, vol. 1.

* cited by examiner

*Primary Examiner* — Cynthia H Kelly
*Assistant Examiner* — Monique M Wills
(74) *Attorney, Agent, or Firm* — Sughrue Mion, PLLC

(57) ABSTRACT

Provided is a sodium ion conductor whose sodium ion conductivity is improved more than the conventional. The sodium ion conductor is a molecular crystal constituted of $NaCB_9H_{10}$, $NaCB_{11}H_{12}$, and a sodium halide, the sodium halide having a mol fraction of more than 0 and at most 70 on the basis of the total mol ratio of $NaCB_9H_{10}$, $NaCB_{11}H_{12}$, and the sodium halide.

8 Claims, 2 Drawing Sheets

SODIUM ION CONDUCTOR AND SOLID-STATE SODIUM-ION BATTERY

FIELD

The present application relates to a sodium ion conductor and a solid-state sodium-ion battery.

BACKGROUND

Lithium ion secondary batteries are used as power sources for mobile devices and as automotive batteries, as their characteristics of high capacity and the lightweight are fully used. It is being considered to use a solid electrolyte as an electrolyte of lithium ion secondary batteries instead of an electrolyte solution.

A great rise in prices of raw materials for lithium is giving cause for concern. Attention is thus paid to solid-state sodium-ion batteries that use sodium, whose reserves as a resource are rich, as a material instead of lithium. Solid-state sodium-ion batteries need a sodium ion conductor having sodium ion conductivity.

Wan Si Tang et al., "Stabilizing Superionic-Conducting Structures Via Mixed-Anion Solid Solutions of Monocarba-closo-borate Salts", Acs Energy LETTERS, 2016, 1, 659-664. discloses a sodium ion conductor obtained by mixing $NaCB_9H_{10}$ and $NaCB_{11}H_{12}$ so that $NaCB_9H_{10}$ and $NaCB_{11}H_{12}$ have a molar ratio of 50:50.

SUMMARY

Technical Problem

The sodium ion conductor using $NaCB_9H_{10}$ and $NaCB_{11}H_{12}$ as described in Wan Si Tang et al. is still developing, and there is room for improvement in sodium ion conductivity thereof. Thus, a major object of the present disclosure is to provide a sodium ion conductor whose sodium ion conductivity is improved more than the conventional.

Solution to Problem

As a result of their intensive studies to solve the foregoing problem, the inventors of the present disclosure found that a sodium ion conductor whose sodium ion conductivity is improved more than the conventional can be produced via formation of a molecular crystal by mixing a sodium halide with $NaCB_9H_{10}$ and $NaCB_{11}H_{12}$. This is believed to be because containing a sodium halide within a given range suppresses a shortage of Na carriers in the sodium ion conductor.

Based on the foregoing findings, the present application discloses, as one means for solving the foregoing problem, a sodium ion conductor that is a molecular crystal constituted of $NaCB_9H_{10}$, $NaCB_{11}H_{12}$, and a sodium halide, the sodium halide having a mol fraction of more than 0 and at most 70 on the basis of the total mol ratio of $NaCB_9H_{10}$, $NaCB_{11}H_{12}$, and the sodium halide.

In the sodium ion conductor, the sodium halide is preferably NaF. The sodium halide contained in the sodium ion conductor preferably has a mol fraction of 0.1 to 60. Further, the fractions of $NaCB_9H_{10}$ and $NaCB_{11}H_{12}$ contained in the sodium ion conductor are preferably such that $NaCB_9H_{10}$:$NaCB_{11}H_{12}$ is equal to 50:50 to 90:10 in terms of mol ratio.

The present application also discloses a solid-state sodium-ion battery comprising: a cathode active material layer; an anode active material layer; and a solid electrolyte layer that is arranged between the cathode active material layer and the anode active material layer, the solid electrolyte layer containing the foregoing sodium ion conductor.

Advantageous Effects

The present disclosure can provide a sodium ion conductor whose sodium ion conductivity is improved more than the conventional. A solid-state sodium-ion battery containing the sodium ion conductor can be also provided.

DESCRIPTION OF EMBODIMENTS

Figure 1:
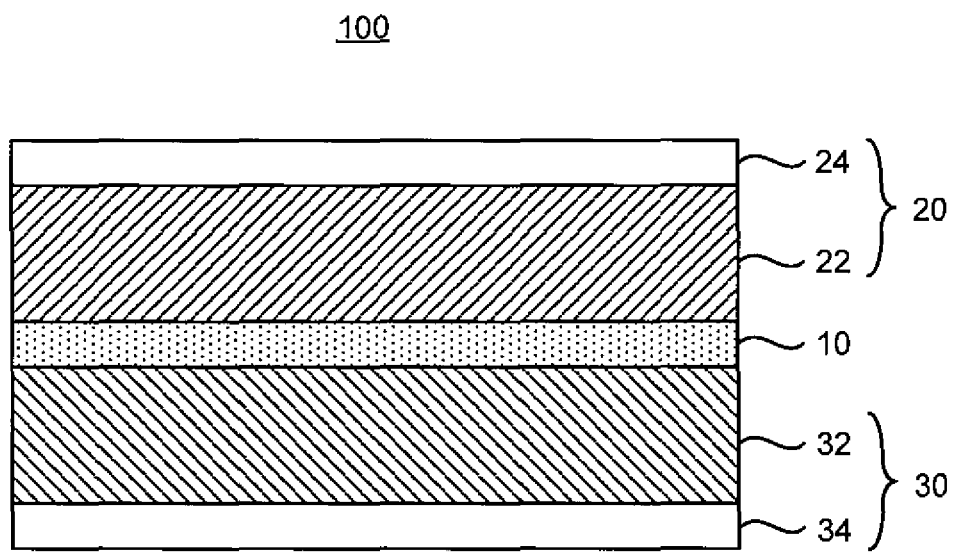
FIG. 1 is a schematically cross-sectional view of a solid-state sodium-ion battery 100.

[Sodium ion conductor]A sodium ion conductor of the present disclosure is a molecular crystal constituted of $NaCB_9H_{10}$, $NaCB_{11}H_{12}$, and a sodium halide. The sodium ion conductor may contain impurities contained in raw materials, and impurities inevitably contained in producing steps thereof since it is difficult to completely remove these impurities.

The sodium halide is preferably NaF. The sodium ion conductor containing the sodium halide suppresses a shortage of Na carriers therein, to improve the sodium ion conductivity thereof.

In the sodium ion conductor, the content of each of $NaCB_9H_{10}$, $NaCB_{11}H_{12}$, and the sodium halide is as follows: the sodium halide having a mol fraction of more than 0 and at most 70 is contained on the basis of the total mol ratio of $NaCB_9H_{10}$, $NaCB_{11}H_{12}$, and the sodium halide. It is effective in improving the sodium ion conductivity to contain the sodium halide even slightly as described above. The sodium halide having a mol fraction of more than 70 lowers the sodium ion conductivity. This is believed to be because the fraction of $NaCB_9H_{10}$ and $NaCB_{11}H_{12}$, which take responsibility for Na ion conduction, lowers.

The mol fraction of the sodium halide is preferably 0.1 to 60, more preferably 10 to 60, and further preferably 30 to 50.

In contrast, the fractions of $NaCB_9H_{10}$ and $NaCB_{11}H_{12}$ are not particularly limited, but $NaCB_9H_{10}$:$NaCB_{11}H_{12}$ is preferably equal to 50:50 to 90:10, more preferably equal to 60:40 to 80:20, and further preferably equal to 65:35 to 75:25, in terms of mol ratio. This improves the sodium ion conductivity. This is because a mixture of $NaCB_9H_{10}$ and $NaCB_{11}H_{12}$ within this range of the fractions has a structure having high sodium ion conductivity.

It can be confirmed by X-ray diffraction (XRD) measurement or the like that the sodium ion conductor has a given crystal structure. The crystal state of the sodium ion conductor can be confirmed by, for example, powder X-ray diffraction measurement using CuKα radiation on the sodium ion conductor.

The sodium ion conductor is preferably in the form of a particle in view of good handleability. The average particle diameter ($D_{50}$) of particles in the sodium ion conductor can be, but is not particularly limited to, 0.5 μm to 2 μm. In the present description, an average particle diameter of particles is a value of a median diameter ($D_{50}$) measured by particle diameter distribution measurement by the laser diffraction/ scattering method on a volume basis unless otherwise particularly specified. A median diameter ($D_{50}$) is a diameter (volume average diameter) such that the cumulative particle volume is half (50%) of the entire when the volume of a particle having this diameter is cumulated if the volumes of the entire particles are cumulated in order of particle diameter from small.

As the method of producing the sodium ion conductor, for example, a raw material composition ($NaCB_9H_{10}$, $NaCB_{11}H_{12}$, and the sodium halide) undergo a solid-phase reaction, which makes it possible to obtain the sodium ion conductor. The solid-phase reaction can be undergone by ball milling. The solid-phase reaction is preferably undergone in an inert atmosphere.

Since having higher sodium ion conductivity than the conventional, for example, the sodium ion conductor of the present disclosure can be preferably used as a solid electrolyte used for sodium ion batteries. Hereinafter a solid-state sodium-ion battery using the sodium ion conductor of the present disclosure as a solid electrolyte will be described.

[Solid-State Sodium-Ion Battery]

A solid electrolyte layer using the sodium ion conductor of the present disclosure as a solid electrolyte can be applied to a solid-state sodium-ion battery, to preferably use the sodium ion conductor of the present disclosure for the solid-state sodium-ion battery. The sodium ion conductor of the present disclosure is preferable for a solid electrolyte of a solid-state sodium-ion battery since sodium ion conductivity is improved.

FIG. 1 shows a schematically cross-sectional view of a solid-state sodium-ion battery 100 including a solid electrolyte layer 10 that is made using the sodium ion conductor of the present disclosure as a solid electrolyte. The solid-state sodium-ion battery 100 shown in FIG. 1 has a cathode active material layer 22, an anode active material layer 32, the solid electrolyte layer 10 that is formed between the cathode active material layer 22 and the anode active material layer 32, a cathode current collector 24 to collect currents from the cathode active material layer 22, and an anode current collector 34 to collect currents from the anode active material layer 32. The cathode active material layer 22 and the cathode current collector 24 constitute a cathode 20, and the anode active material layer 32 and the anode current collector 34 constitute an anode 30.

<Solid Electrolyte Layer 10>

The sodium ion conductor of the present disclosure is used as a solid electrolyte, to form the solid electrolyte layer of the solid-state sodium-ion battery. The content of the sodium ion conductor of the present disclosure in the solid electrolyte layer is such that: when the total mass of the solid electrolyte layer is defined as 100 mass %, the lower limit thereof is preferably at least 80.0 mass %, more preferably at least 90.0 mass %, further preferably at least 95.0 mass %, and further preferably at least 99.0 mass %; and the upper limit thereof is not particularly limited, but the solid electrolyte layer may be formed of the sodium ion conductor only.

The solid electrolyte layer may contain a binder to bind solid electrolyte particles to each other in view of the development of plasticity etc. In view of the prevention of low ionic conductivity of the solid electrolyte layer 10, the content of the binder is preferably at most 20 mass %, more preferably at most 10 mass %, further preferably at most 5 mass %, and further preferably at most 1 mass %, when the total mass of the solid electrolyte layer 10 is defined as 100 mass %.

The thickness of the solid electrolyte layer is suitably adjusted according to the structure of the battery, and is usually, but not particularly limited to, 0.1 μm to 1 mm.

Examples of the method of forming such a solid electrolyte layer may include pressure molding on a powder of materials of the solid electrolyte layer including the sodium ion conductor, and other components as necessary, to form the solid electrolyte layer. As another method thereof, one may apply a slurry for the solid electrolyte layer which contains the binder onto a support, dry up the slurry for the solid electrolyte layer, and remove the support, to form the solid electrolyte layer.

<Cathode Active Material Layer 22>

The cathode active material layer 22 contains a cathode active material. More specifically, the cathode active material layer 22 may optionally contain a conductive material, a binder, and a solid electrolyte, other than the cathode active material.

(Cathode Active Material)

The cathode active material is a composite oxide containing Na. Any known one as a cathode active material of solid-state sodium-ion batteries may be employed. "Composite oxide containing Na" means an oxide containing a metal element other than Na (such as a transition metal element) and/or a non-metallic element (such as P and S), in addition to Na. Examples thereof include layered compounds, spinel compounds, and polyanionic compounds. Specifically, any known cathode active material such as: $Na_xMO_2$ ($0 < x \leq 1$ where M is at least one of Fe, Ni, Co, Mn, V, and Cr) as a layered compound or a spinel compound; and $Na_3V_2(PO_4)_3$, $Na_2Fe_2(SO_4)_3$, $NaFePO_4$, $NaFeP_2O_7$, $Na_2MP_2O_7$ (M is at least one of Fe, Ni, Co and Mn), and $Na_4M_3(PO_4)_2P_2O_7$ (M is at least one of Fe, Ni, Co and Mn) as a polyanionic compound may be employed.

The cathode active material is preferably in the form of a particle. The average particle diameter ($D_{50}$) of the cathode active material is, for example, within the range of 1 nm to 100 μm, and among the range, preferably within the range of 10 nm to 30 μm. The content of the cathode active material in the cathode is not particularly limited, but for example, preferably 60 mass % to 99 mass %, and more preferably 70 mass % to 95 mass % when the total mass of the cathode active material, and the conductive material and the binder, which will be described later, is defined as 100 mass %.

(Conductive Material)

The conductive material is not particularly limited, but any known one as a conductive material of solid-state sodium-ion batteries may be employed. Examples thereof include carbon materials. Carbon materials may include acetylene black, Ketjenblack, VGCF (vapor-grown carbon fiber), and graphite. The content of the conductive material in the cathode is not particularly limited, but is preferably within the range of 5 mass % to 40 mass %, and more preferably within the range of 10 mass % to 40 mass %.

(Binder)

The binder is not particularly limited as long as being chemically and electrically stable. Examples thereof include fluorine-based binding materials such as polyvinylidene fluoride (PVDF) and polytetrafluoroethylene (PTFE), rubber-based binding materials such as styrene-butadiene rubber (SBR), olefinic binding materials such as polypropylene (PP) and polyethylene (PE), and cellulose-based binding materials such as carboxymethyl cellulose (CMC). The content of the binder in the cathode is not particularly limited, but is preferably within the range of 1 mass % to 40 mass %.

(Solid Electrolyte)

The solid electrolyte is not particularly limited as long as having desired ionic conductivity. Examples thereof include the sodium ion conductor of the present disclosure, known oxide solid electrolytes, and known sulfide solid electrolytes. The content of the solid electrolyte in the cathode is not particularly limited, but preferably within the range of 1 mass % to 40 mass %.

The thickness of the cathode active material layer 22 is suitably adjusted according to the structure of the battery, and is usually, but not particularly limited to, 0.1 μm to 1 mm.

The method of making the cathode active material layer 22 is not particularly limited. The cathode active material layer 22 can be easily made in a dry or wet condition. That is, the foregoing constituents are added to a suitable solvent to be a slurry, and the slurry is applied to a surface of a base material (which may be the cathode current collector described later or the solid electrolyte layer) and thereafter dried up, which makes it possible to easily make the cathode active material layer 22 having a given thickness in a wet condition. Or, the cathode active material layer 22 may be obtained by, for example, mixing the foregoing constituents in a dry condition to press-mold the mixture.

<Cathode Current Collector 24>

The cathode 20 usually includes the cathode current collector 24. Examples of the material of the cathode current collector 24 include SUS, aluminum, nickel, iron, titanium, and carbon. The cathode current collector 24 may be, for example, in the form of foil, in the form of mesh, or in a porous form. Layering the cathode current collector 24 onto the cathode active material layer 22 makes it possible to easily make the cathode 20. The cathode current collector 24 may be omitted according to the material contained in the cathode active material layer 22. In this case, the cathode active material layer 22 itself is the cathode 20.

<Anode Active Material Layer 32>

The anode active material layer 32 contains an anode active material. More specifically, the anode active material layer 32 may optionally contain a conductive material, a binder, and a solid electrolyte, other than the anode active material.

(Anode Active Material)

The anode active material is not particularly limited. Any known one as an anode active material of sodium ion secondary batteries may be employed. Examples thereof include metallic materials containing sodium, such as sodium metal and sodium alloys; carbon materials such as graphite, hard carbon, and carbon black; sodium-transition metal composite oxides such as sodium titanate; and oxides constituted of elements other than sodium, such as $SiO_x$. The anode active material is preferably in the form of a particle as well as the cathode active material.

(Conductive Material, Binder and Solid Electrolyte)

Any conductive material, binder or solid electrolyte that may be employed for the cathode active material layer 22 may be employed for the anode active material layer 32. They are optional components, and the contents thereof are not particularly limited either. The configuration thereof may be the same as in the cathode active material 22.

The thickness of the anode active material layer 32 is suitably adjusted according to the structure of the battery, and is usually, but not particularly limited to, 0.1 μm to 1 mm.

The method of making the anode active material layer 32 is not particularly limited. The anode active material layer 32 can be easily made in a dry or wet condition as well as the cathode active material layer 22.

<Anode Current Collector 34>

The anode 30 usually includes the anode current collector 34. Examples of the material of the anode current collector 34 include SUS, aluminum, nickel, copper, and carbon. The anode current collector 34 may be, for example, in the form of foil, in the form of mesh, or in a porous form. Layering the anode current collector 34 onto the anode active material layer 32 makes it possible to easily make the anode 30. The anode current collector 34 may be omitted according to the material contained in the anode active material layer 32. In this case, the anode active material layer 32 itself is the anode 30.

<Other Structures>

A general battery case may be used as a case without any particular limitations. Examples thereof include a battery case made of SUS. The solid-state sodium-ion battery may be a primary battery, and may be a secondary battery. The solid-state sodium-ion battery is preferably a secondary battery in view of a more effective improvement in durability. This is because secondary batteries can be repeatedly charged and discharged, and are useful for, for example, automotive batteries. Primary batteries include batteries used as a primary battery (used for the purpose of discharge once after charged). The solid-state sodium-ion battery of the present disclosure may be, for example, in the form of a coin, a laminate, a cylinder, or a rectangle. The method of producing the solid-state sodium-ion battery is not particularly limited, and is the same as a general method of producing a solid-state sodium-ion battery.

EXAMPLES

Hereinafter the sodium ion conductor of the present disclosure will be described using Examples.

$NaCB_9H_{10}$ (manufactured by Katchem), $NaCB_{11}H_{12}$ (manufactured by Katchem), and NaF (manufactured by Kojundo Chemical Laboratory Co., Ltd.) were subjected to vacuum drying at 160° C. overnight, weighed so as to have fractions shown in Table 1 in terms of mol % in each example, and put into 45 mL of a ball mill pot (made from $ZrO_2$). Further, 20 balls (5 mm in diameter) made from $ZrO_2$ were put into the ball mill pot, and mixed at 500 rpm for 20 hours, to carry out ball milling. Thereby a sodium ion conductor was obtained.

TABLE 1

|  | $NaCB_9H_{10}$ | $NaCB_{11}H_{12}$ | NaF |
| --- | --- | --- | --- |
| Comparative Example 1 | 0 | 0 | 100 |
| Example 1 | 21 | 9 | 70 |
| Example 2 | 35 | 15 | 50 |
| Example 3 | 49 | 21 | 30 |
| Example 4 | 63 | 27 | 10 |
| Reference Example | 70 | 30 | 0 |
| Comparative Example 2 | 50 | 50 | 0 |

Unit: mol %

[Evaluation of Sodium Ion Conductivity]

The sodium ion conductivities were measured to evaluate sodium ion conductivity, which is specifically as follows.

The obtained sodium ion conductor of each example was weighed by 50 mg to be put into an evaluation cell, and subjected to press molding at 6 ton for 3 minutes, to be a cylindrical pellet whose top and bottom faces each had an area of 1 $cm^2$, and thereafter constrained and then included in a glass desiccator. Then the impedance thereof was measured under the conditions of: temperature: 25° C.; measured frequency: 0.01 MHz to 1 MHz; and amplitude: 10 mV. The ion conductivity (mS/cm) thereof was calculated from the measured impedance.

[Results]

Figure 2:
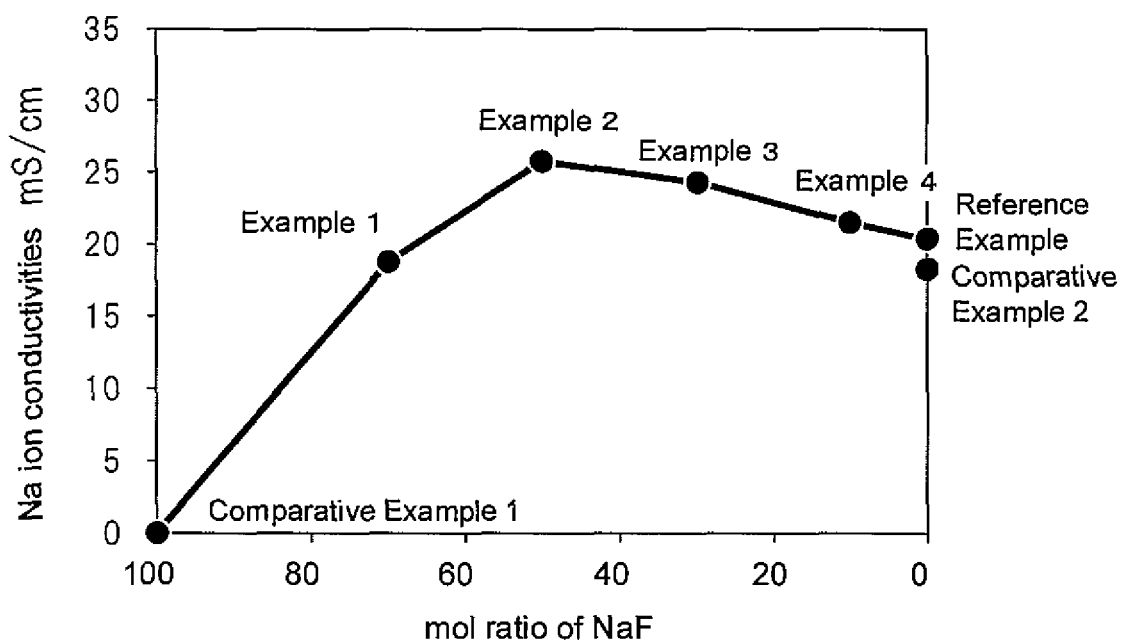
FIG. 2 is a graph showing the sodium ion conductivities of Examples, Comparative Examples and Reference Example.

The results are shown in FIG. 2. In this drawing, the horizontal axis shows the mol ratio of NaF, and the vertical axis shows the sodium ion conductivities (mS/cm). As seen from FIG. 2, it is found that a sodium ion conductivity when the mol ratio of NaF is more than 0 and at most 70 is higher than those of Comparative Examples 1 and 2. The sodium conductivities of Examples 2 to 4 are higher than that of Reference Example, and among them, the sodium ion conductivities of Examples 2 and 3 are relatively high.

REFERENCE SIGNS LIST 10 solid electrolyte layer
20 cathode
22 cathode active material layer
24 cathode current collector
30 anode
32 anode active material layer
34 anode current collector
100 solid-state sodium-ion battery

What is claimed is:

1. A sodium ion conductor that is a molecular crystal constituted of $NaCB_9H_{10}$, $NaCB_{11}H_{12}$, and a sodium halide, the sodium halide having a mol fraction of more than 0 and at most 70 on the basis of a total mol ratio of $NaCB_9H_{10}$, $NaCB_{11}H_{12}$, and the sodium halide.

2. The sodium ion conductor according to claim 1, wherein the sodium halide is NaF.

3. The sodium ion conductor according to claim 1, wherein the sodium halide has a mol fraction of 0.1 to 60.

4. The sodium ion conductor according to claim 1, wherein
fractions of $NaCB_9H_{10}$ and $NaCB_{11}H_{12}$ are such that $NaCB_9H_{10}$:$NaCB_{11}H_{12}$ is equal to 50:50 to 90:10 in terms of mol ratio.

5. A solid-state sodium-ion battery comprising:
a cathode active material layer;
an anode active material layer; and
a solid electrolyte layer that is arranged between the cathode active material layer and the anode active material layer, the solid electrolyte layer containing a sodium ion conductor that is a molecular crystal constituted of $NaCB_9H_{10}$, $NaCB_{11}H_{12}$, and a sodium halide, the sodium halide having a mol fraction of more than 0 and at most 70 on the basis of a total mol ratio of $NaCB_9H_{10}$, $NaCB_{11}H_{12}$, and the sodium halide.

6. The sodium ion conductor according to claim 5, wherein the sodium halide is NaF.

7. The sodium ion conductor according to claim 5, wherein the sodium halide has a mol fraction of 0.1 to 60.

8. The sodium ion conductor according to claim 5, wherein
fractions of $NaCB_9H_{10}$ and $NaCB_{11}H_{12}$ are such that $NaCB_9H_{10}$:$NaCB_{11}H_{12}$ is equal to 50:50 to 90:10 in terms of mol ratio.

* * * * *